(12) United States Patent
Yun

(10) Patent No.: US 10,151,069 B2
(45) Date of Patent: *Dec. 11, 2018

(54) METHOD FOR CONSTRUCTING CONTINUOUSLY REINFORCED CONCRETE PAVEMENT USING FOAM SHOTCRETE

(71) Applicant: KANGWON NATIONAL UNIVERSITY UNIVERSITY-INDUSTRY COOPERRATION FOUNDATION, Gangwon-do (KR)

(72) Inventor: Kyong Ku Yun, Seoul (KR)

(73) Assignee: Kangwon National University University-Industry Cooperation Foundation, Chuncheon-si, Gangwon-do (KR)

( * ) Notice: Subject to any disclaimer, the term of this patent is extended or adjusted under 35 U.S.C. 154(b) by 151 days.

This patent is subject to a terminal disclaimer.

(21) Appl. No.: 15/112,354

(22) PCT Filed: Jan. 12, 2015

(86) PCT No.: PCT/KR2015/000271
§ 371 (c)(1),
(2) Date: Jul. 18, 2016

(87) PCT Pub. No.: WO2015/111860
PCT Pub. Date: Jul. 30, 2015

(65) Prior Publication Data
US 2016/0333533 A1      Nov. 17, 2016

(30) Foreign Application Priority Data

Jan. 24, 2014 (KR) .................. 10-2014-0008784

(51) Int. Cl.
*E01C 11/18* (2006.01)
*E01C 7/14* (2006.01)
(Continued)

(52) U.S. Cl.
CPC ............ *E01C 11/18* (2013.01); *C04B 14/062* (2013.01); *C04B 14/106* (2013.01); *C04B 16/04* (2013.01);
(Continued)

(58) Field of Classification Search
CPC .......... E01C 7/142; E01C 11/18; E01C 11/20; E01C 19/22; C04B 38/10; C04B 14/062;
(Continued)

(56) References Cited

U.S. PATENT DOCUMENTS

| 3,669,417 A * | 6/1972 | Cornwell ............... B28C 5/026 366/5 |
| 4,073,592 A * | 2/1978 | Godberson ........... E01C 19/407 404/105 |
| 5,803,964 A * | 9/1998 | Scarborough ........... E04B 1/161 106/724 |

FOREIGN PATENT DOCUMENTS

| KR | 10-2012-0012615 | 2/2012 |
| KR | 10-1133569 | 4/2012 |

(Continued)

OTHER PUBLICATIONS

"Continuously Reinforce Concrete Pavement Performance and Best Practices" in TechBrief Sep. 2012 FHWA-HIF-12-039 p. 1-12 (Year: 2012).*
(Continued)

*Primary Examiner* — Nathan H Empie
(74) *Attorney, Agent, or Firm* — Rabin & Berdo, P.C.

(57) ABSTRACT

The present invention relates to a method for constructing a continuously reinforced concrete pavement using foam shot-
(Continued)

crete by: positioning continuous reinforcement bars on a base layer where a concrete pavement is constructed; producing normal concrete having a compressive strength of 21-30 MPa from a batch plant and transporting same to a construction site; and shooting a normal strength concrete, which has been produced by mixing, with a mixing part, fly ash or fine slag powder or a low-grade mixed material produced by mixing the fly and the fine slag powder in a state in which fluidity has been increased by mixing in 20-40% of air bubbles with respect to volume, or shooting a high-performance concrete, which has been produced by mixing, with the mixing part, one or a mixture of two or more of silica fume, meta-kaolin, latex, polymers, and a coloring material.

17 Claims, 7 Drawing Sheets

(51) Int. Cl.
| | | |
|---|---|---|
| C04B 14/06 | (2006.01) | |
| C04B 14/10 | (2006.01) | |
| C04B 16/04 | (2006.01) | |
| C04B 18/08 | (2006.01) | |
| C04B 18/14 | (2006.01) | |
| C04B 38/10 | (2006.01) | |
| E01C 11/20 | (2006.01) | |
| E01C 19/22 | (2006.01) | |
| C04B 111/00 | (2006.01) | |

(52) U.S. Cl.
CPC ............ *C04B 18/08* (2013.01); *C04B 18/141* (2013.01); *C04B 38/10* (2013.01); *E01C 7/142* (2013.01); *E01C 11/20* (2013.01); *E01C 19/22* (2013.01); *C04B 2111/00155* (2013.01); *C04B 2111/00612* (2013.01); *Y02W 30/94* (2015.05)

(58) Field of Classification Search
CPC ..... C04B 14/106; C04B 16/04; C04B 18/141; C04B 18/08
See application file for complete search history.

(56) References Cited

FOREIGN PATENT DOCUMENTS

| | | |
|---|---|---|
| KR | 10-1215784 | 12/2012 |
| KR | 10-1240284 | 3/2013 |
| KR | 10-1245828 | 3/2013 |
| KR | 10-1308702 | 9/2013 |

OTHER PUBLICATIONS

"Shotcreting in Australia" Second Edition by Concrete Institute of Australia Sep. 2010 pp. 1-84 (Year: 2010).*

International Search Report dated Apr. 27, 2015 for PCT/KR2015/000271.

* cited by examiner

COMPARISON FOR CARBON BLACK
ADDED BY 3%, 1% AND NOT ADDED

METHOD FOR CONSTRUCTING CONTINUOUSLY REINFORCED CONCRETE PAVEMENT USING FOAM SHOTCRETE

This application claims the priority of Korean Patent Application Nos. 10-2014-0008784, filed on Jan. 24, 2014 in the KIPO (Korean Intellectual Property Office), the disclosure of which is incorporated herein entirely by reference. Further, this application is the National Stage application of International Application No. PCT/KR2015/000271, filed Jan. 12, 2015, which designates the United States and was published in Korean. Each of these applications is hereby incorporated by reference in their entirety into the present application.

TECHNICAL FIELD

The present disclosure relates to a method for constructing a concrete pavement, and more particularly, to a method for constructing a continuously reinforced concrete pavement using foam shotcrete, in which continuous reinforcement bars are positioned at a base layer where a concrete pavement is constructed, a normal concrete having a compressive strength of 21 to 30 MPa is produced at a batcher plant and transported to a construction site, and then a normal strength concrete formed by mixing a low-grade mixed material selected from fly ash, fine slag powder and a mixture thereof by using a mixing part in a state where 20 to 40% of air bubbles in volume are put thereto to enhance fluidity or a high-performance concrete formed by mixing a high-grade mixed material selected from silica fume, meta-kaolin, latex, polymer, coloring material and mixtures thereof by using a mixing part in a state where air bubbles are put into the normal concrete to enhance fluidity is shot to construct a continuously reinforced concrete pavement, thereby ensuring high strength and high durability to facilitate easy maintenance and also allowing easy construction due to a lightweight slip form paver since it is not required for tamping the shot normal strength concrete or the shot high-performance concrete.

BACKGROUND ART

A concrete pavement is generally classified into a continuously reinforced concrete pavement and a plain joint concrete pavement depending on reinforcement of steel bars. In the continuously reinforced concrete pavement, the change of volume of concrete caused by temperature change or drying shrinkage is not artificially controlled using joints, but longitudinal steel bars are continuously positioned as much as about 0.7% to generate a tensile force when the volume of the concrete is likely to decrease, thereby causing cracks when a tensile stress exceeds a set tensile strength at any point.

In the continuously reinforced concrete pavement, since concrete should be placed after steel bars are positioned, when the concrete is placed, the concrete should be supplied at a side of a road to be constructed, which however is not easily applied to a domestic environment having a narrow work space.

In order to form the continuously reinforced concrete pavement, generally, a normal concrete with a slump of 40 mm or below is produced at a batcher plant and transported to a construction spot by means of a dump truck, and then the normal concrete is placed at once using a slip form paver. Since the slip form paver places concrete into a thickness of 250 to 300 mm as much as two or more lanes at once, the slip form paver is very heavy with a weight of 150 tons or more, and thus a lot of costs and time are required for installing the slip form paver.

The continuously reinforced concrete pavement generally uses a normal strength concrete, which however does not ensure long-term durability. The long-term durability may be ensured if a high-performance concrete is used for construction.

The high-performance concrete represents a concrete having high strength, high durability and high fluidity in comparison to a normal concrete where water, cement, aggregate or the like are mixed. The high strength means a strength of 35 MPa or above, the high durability demands freeze-thaw resistance of 90% or above, and the high fluidity means very excellent workability. Thus, the construction using the high-performance concrete ensures better durability in comparison to the construction using a normal strength concrete, thereby allowing inexpensive construction.

RELATED LITERATURES

Korean Patent Registration No. 10-1240294
Korean Patent Registration No. 10-1245828

DISCLOSURE OF THE INVENTION

Technical Problem

The present disclosure is designed to solve the above problems, and the present disclosure is directed to providing a method for constructing a continuously reinforced concrete pavement using foam shotcrete, in which a normal concrete having a compressive strength of 21 to 30 MPa is produced at a batcher plant and transported to a construction site, and then a normal strength concrete formed by mixing a low-grade mixed material selected from fly ash, fine slag powder and a mixture thereof by using a mixing part in a state where 20 to 40% of air bubbles in volume are put thereto to enhance fluidity or a high-performance concrete formed by mixing a high-grade mixed material selected from silica fume, meta-kaolin, latex, polymer, coloring material and mixtures thereof by using a mixing part in a state where air bubbles are put into the normal concrete to enhance fluidity is shot to construct a continuously reinforced concrete pavement on a base layer at which continuous reinforcement bars are positioned.

In addition, the present disclosure is directed to providing a method for constructing a continuously reinforced concrete pavement using foam shotcrete, in which a lower layer of a continuously reinforced concrete pavement is formed with a normal strength concrete prepared by mixing a low-grade mixed material selected from fly ash, fine slag powder and a mixture thereof into a normal concrete containing air bubbles by using a mixing part, and an upper layer of the continuously reinforced concrete pavement is formed with a high-performance concrete prepared by mixing a high-grade mixed material selected from silica fume, meta-kaolin, latex, polymer, coloring material and mixtures thereof into a normal concrete containing air bubbles by using a mixing part, thereby ensuring high strength and high durability and thus facilitating easy maintenance.

In addition, the present disclosure is directed to providing a method for constructing a continuously reinforced concrete pavement using foam shotcrete, in which continuous reinforcement bars are positioned between a slip form paver and a pump car, which may be formed up to 50 m just before placing concrete, so that the concrete may be fully supplied to a base layer at which the continuous reinforcement bars are positioned when being placed, thereby allowing a construction work without regard to a working space.

Technical Solution

In one general aspect, the present disclosure provides a method for constructing a continuously reinforced concrete pavement using foam shotcrete, comprising:

positioning steel bars at regular intervals in longitudinal and transverse directions on a base layer where a continuously reinforced concrete pavement is constructed, to be continuously connected for reinforcement;

producing a normal concrete having a compressive strength of 21 to 30 MPa by mixing water, cement and aggregate at a predetermined ratio and transporting the normal concrete to a construction site;

mixing the normal concrete with air bubbles and a high-grade mixed material selected from the group consisting of silica fume, meta-kaolin, latex, polymer, coloring material, and mixtures thereof by using a mixing part to form a high-performance concrete;

when the high-performance concrete is discharged to a shooting guide member, shooting the high-performance concrete to the base layer, while dissipating the air bubbles included in the high-performance concrete to reduce a slump thereof by blowing a high-pressure compressed air of 5 atmospheres or above, thereby forming a continuously reinforced concrete pavement in which the steel bars are embedded; and finishing the continuously reinforced concrete pavement to have a horizontal top surface.

In another aspect, the present disclosure provides a method for constructing a continuously reinforced concrete pavement using foam shotcrete, comprising:

positioning steel bars at regular intervals in longitudinal and transverse directions on a base layer where a continuously reinforced concrete pavement is constructed, to be continuously connected for reinforcement;

producing a normal concrete having a compressive strength of 21 to 30 MPa by mixing water, cement and aggregate at a predetermined ratio and transporting the normal concrete to a construction site;

mixing the normal concrete with air bubbles and a low-grade mixed material selected from the group consisting of fly ash, fine slag powder, and mixtures thereof by using a mixing part to form a normal strength concrete, and when the normal strength concrete is discharged to a shooting guide member, shooting the normal strength concrete to the base layer, while dissipating the air bubbles included in the normal strength concrete to reduce a slump thereof by blowing a high-pressure compressed air of 5 atmospheres or above, thereby forming a lower layer of a continuously reinforced concrete pavement in which the steel bars are embedded; and mixing the normal concrete with air bubbles and a high-grade mixed material selected from the group consisting of silica fume, meta-kaolin, latex, polymer, coloring material, and mixtures thereof by using a mixing part to form a high-performance concrete, and when the high-performance concrete is discharged to the shooting guide member, shooting the high-performance concrete to the lower layer, while dissipating the air bubbles included in the high-performance concrete to reduce a slump thereof by blowing a high-pressure compressed air of 5 atmospheres or above, thereby forming an upper layer of the continuously reinforced concrete pavement; and finishing the continuously reinforced concrete pavement to have a horizontal top surface.

Advantageous Effects

According to the present disclosure, a normal concrete having a compressive strength of 21 to 30 MPa is produced at a batcher plant and transported to a construction site, and then a normal strength concrete formed by mixing a low-grade mixed material selected from fly ash, fine slag powder and a mixture thereof by using a mixing part in a state where 20 to 40% of air bubbles in volume are put thereto to enhance fluidity or a high-performance concrete formed by mixing a high-grade mixed material selected from silica fume, meta-kaolin, latex, polymer, coloring material and mixtures thereof by using a mixing part in a state where air bubbles are put into the normal concrete to enhance fluidity is shot to construct a continuously reinforced concrete pavement on a base layer at which continuous reinforcement bars are positioned. Therefore, a construction time may be shortened.

In addition, according to the present disclosure, a lower layer of a continuously reinforced concrete pavement is formed with a normal strength concrete prepared by mixing a low-grade mixed material selected from fly ash, fine slag powder and a mixture thereof into a normal concrete containing air bubbles by using a mixing part, and an upper layer of the continuously reinforced concrete pavement is formed with a high-performance concrete prepared by mixing a high-grade mixed material selected from silica fume, meta-kaolin, latex, polymer, coloring material and mixtures thereof into a normal concrete containing air bubbles by using a mixing part, thereby ensuring high strength and high durability and thus facilitating easy maintenance. In addition, in comparison to a case where the continuously reinforced concrete pavement is entirely constructed using a high-performance concrete, the present disclosure may reduce construction costs, thereby improving economic feasibility.

Moreover, according to the present disclosure, continuous reinforcement bars are positioned between a slip form paver and a pump car, which may be formed up to 50 m, just before placing concrete so that the concrete may be fully supplied to a base layer at which the continuous reinforcement bars are positioned when being placed, thereby allowing a construction work without regard to a working space and thus shortening working time with improved work efficiency. In addition, since a shotcrete method which does not require damping is applied to the continuously reinforced concrete pavement, a paving machine may be designed smaller or lighter to ensure easier transportation and installation, and also construction costs may be reduced.

[Detailed Description of Main Elements]

| | |
|---|---|
| 10: batcher plant | 20: reinforcing member |
| 40: concrete mixer truck | 50: pump car |
| 60: mixing part | 70: shooting guide member |
| 80: slip form paver | 100: base layer |
| 200: continuously reinforced concrete pavement | |

MODE FOR CARRYING OUT THE INVENTION

Figure 1:
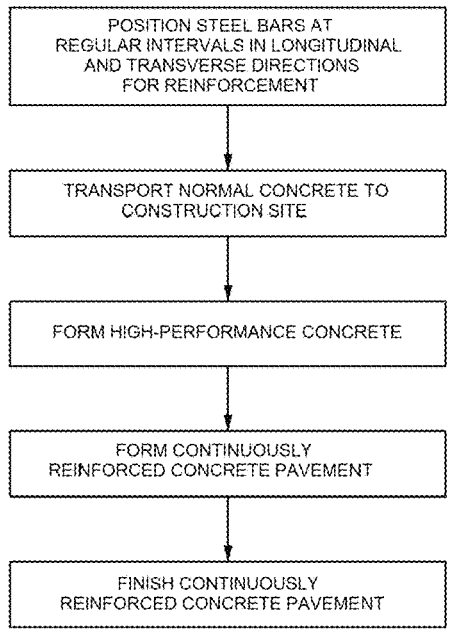
FIG. 1 is a flowchart of the present disclosure.

Hereinafter, the present disclosure will be described in detail with reference to accompanying drawings. FIG. 1 is a flowchart of the present disclosure.

A method for constructing a continuously reinforced concrete pavement using foam shotcrete according to the present disclosure comprises:

positioning steel bars 200' at regular intervals in longitudinal and transverse directions on a base layer 100 where a continuously reinforced concrete pavement 200 is constructed, to be continuously connected for reinforcement;

producing a normal concrete having a compressive strength of 21 to 30 MPa by mixing water, cement and aggregate at a predetermined ratio and transporting the normal concrete to a construction site;

mixing the normal concrete with air bubbles and a high-grade mixed material selected from silica fume, meta-kaolin, latex, polymer, coloring material, and mixtures thereof by using a mixing part 60 to form a high-performance concrete;

when the high-performance concrete is discharged to a shooting guide member 70, shooting the high-performance concrete to the base layer 100, while dissipating the air bubbles included in the high-performance concrete to reduce a slump thereof by blowing a high-pressure compressed air of 5 atmospheres or above, thereby forming a continuously reinforced concrete pavement 200 in which the steel bars 200' are embedded; and finishing the continuously reinforced concrete pavement 200 to have a horizontal top surface.

In addition, the method for constructing a continuously reinforced concrete pavement using foam shotcrete according to the present disclosure may comprise: positioning steel bars 200' at regular intervals in longitudinal and transverse directions on a base layer 100 where a continuously reinforced concrete pavement 200 is constructed, to be continuously connected for reinforcement;

producing a normal concrete having a compressive strength of 21 to 30 MPa by mixing water, cement and aggregate at a predetermined ratio and transporting the normal concrete to a construction site;

mixing the normal concrete with air bubbles and a low-grade mixed material selected from the group consisting of fly ash, fine slag powder, and mixtures thereof by using a mixing part 60 to form a normal strength concrete, and when the normal strength concrete is discharged to a shooting guide member 70, shooting the normal strength concrete to the base layer 100, while dissipating the air bubbles included in the normal strength concrete to reduce a slump thereof by blowing a high-pressure compressed air of 5 atmospheres or above, thereby forming a lower layer 210 of a continuously reinforced concrete pavement 200 in which the steel bars 200' are embedded;

mixing the normal concrete with air bubbles and a high-grade mixed material selected from the group consisting of silica fume, meta-kaolin, latex, polymer, coloring material, and mixtures thereof by using a mixing part 60 to form a high-performance concrete, and when the high-performance concrete is discharged to the shooting guide member 70, shooting the high-performance concrete to the lower layer 210, while dissipating the air bubbles included in the high-performance concrete to reduce a slump thereof by blowing a high-pressure compressed air of 5 atmospheres or above, thereby forming an upper layer 220 of the continuously reinforced concrete pavement 200; and finishing the continuously reinforced concrete pavement 200 to have a horizontal top surface.

Next, a construction process of the present disclosure configured as above will be described.

Figure 2:
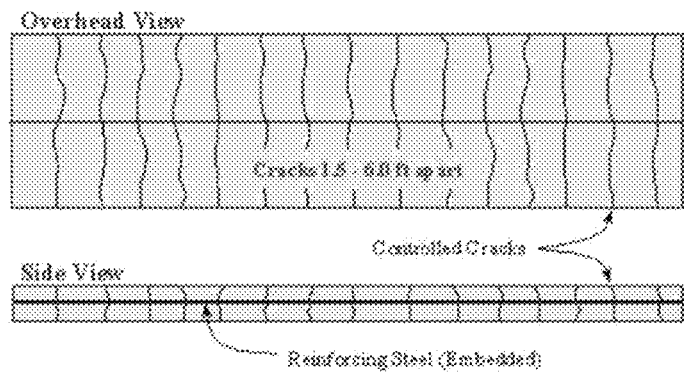
FIGS. 2 and 3 are diagrams showing a continuously reinforced concrete pavement according to the present disclosure.
Figure 3:
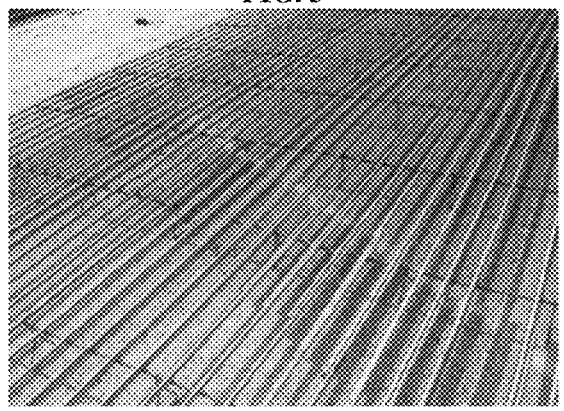

First, as shown in FIGS. 2 and 3, steel bars 200' are positioned at regular intervals in longitudinal and transverse directions on a base layer 100 where a continuously reinforced concrete pavement 200 is constructed, to be continuously connected for reinforcement. Here, the steel bars 200' may be assembled by means of field assembly in a space between a slip form paver and a pump car 50 or may be manufactured at a factory to have a size allowing easy transportation and installation, transported to a construction site and then connected at the construction site.

In addition, the steel bars 200' connected at regular intervals in longitudinal and transverse directions may be positioned between the slip form paver and the pump car 50, which may be formed up to 60 m, just before a high-performance concrete or a normal strength concrete is placed, so that the concrete may be fully supplied at a front side of the base layer 100, thereby allowing a construction work without regard to a working space.

Figure 4:
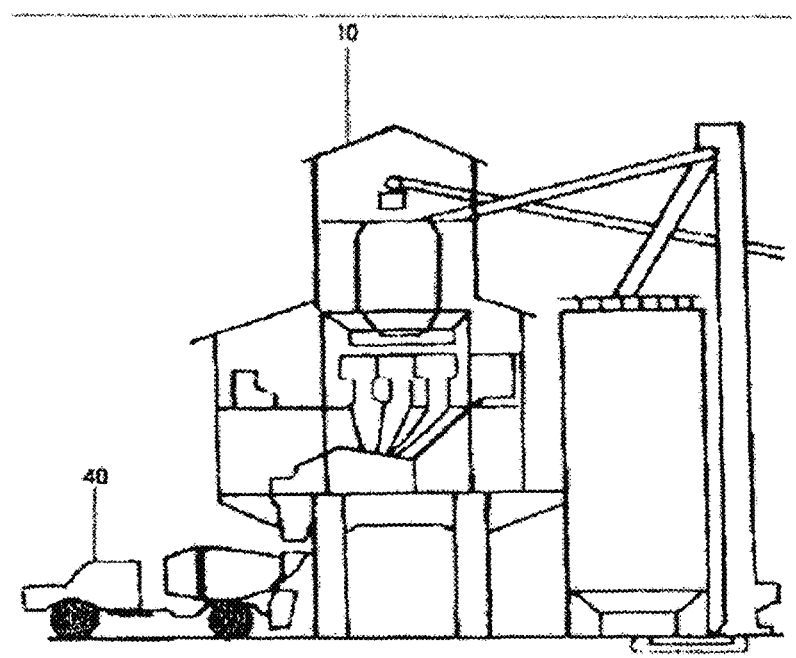
FIG. 4 is a diagram showing a normal concrete formed according to the present disclosure.

In addition, as shown in FIG. 4, in order to form a normal concrete having a compressive strength of 21 to 30 MPa and a slump of 60 to 80 mm, water, cement, and aggregate and so on respectively supplied from a batcher plant 10 are mixed and blended at a predetermined ratio and transported to a construction site by means of a concrete mixer truck 40.

Here, in order to ensure strength of a final shotcrete, a water-cement ratio is set to be 42% or below. Also, in order to form a robust bottom after placing a shotcrete, the slump may be not controlled using the water-cement ratio but adjusted using a water-reducing agent or an AE agent.

Figure 5:
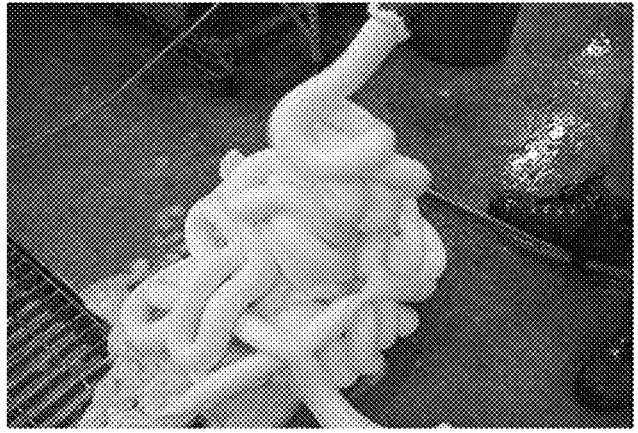
FIG. 5 is a diagram showing air bubbles according to the present disclosure.
Figure 6:
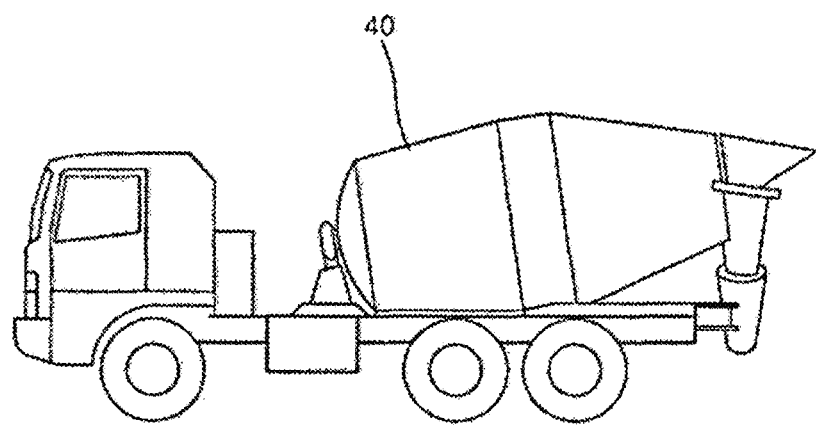
FIGS. 6 and 7 are diagrams showing a mixing part according to the present disclosure.
Figure 7:
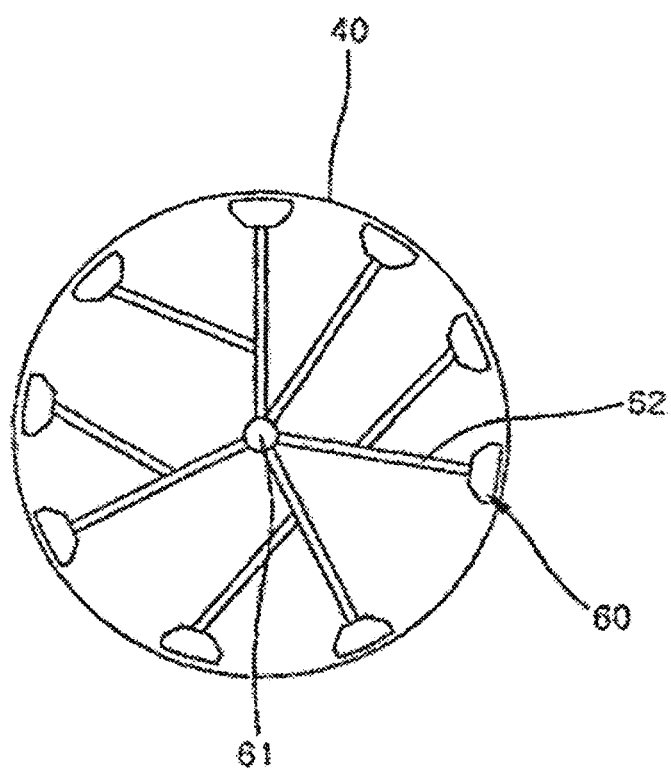

If the concrete mixer truck 40 is transported to a construction site, the normal concrete put into the concrete mixer truck 40 suffers from bad pumping due to an additional loss of slump during the transportation. Thus, as shown in FIG. 5, air bubbles generated by a foaming agent, a bubble forming agent or a bubble generator are put into the concrete mixer truck 40.

At this time, regarding the amount of air bubbles put into the concrete mixer truck 40, in order to put 30% of bubbles, based on the volume of the normal concrete, a bubble generator is operated for about 60 seconds per 1 m3 of normal concrete to generate and put 240 L of bubbles. However, as shown in FIGS. 6 and 7, 20 to 40% of bubbles are added to the normal concrete, based on the entire volume of concrete, is put and regularly mixed by means of a ball bearing effect of the air bubbles and a plurality of mixing members 62 rotatably mounted to a shaft 61 of the mixing part 60. Also, a low-grade mixed material selected from fly ash, fine slag powder and a mixture thereof is mixed with the normal concrete containing air bubbles by using the mixing part 60 to form a normal strength concrete, or a high-grade mixed material selected from silica fume, meta-kaolin, latex, polymer, coloring material and mixtures thereof is mixed with the normal concrete containing air bubbles by using the mixing part 60 to form a high-performance concrete.

Here, the mixed material may enhance a pumping property of the normal concrete and improve high strength and high durability. At this time, the low-grade mixed material may be mixed by the content of 3 to 30 parts by weight, based on 100 parts by weight of cement of the normal concrete, and the high-grade mixed material may be mixed by the content of 2 to 20 parts by weight, based on 100 parts by weight of cement of the normal concrete.

Figure 8:
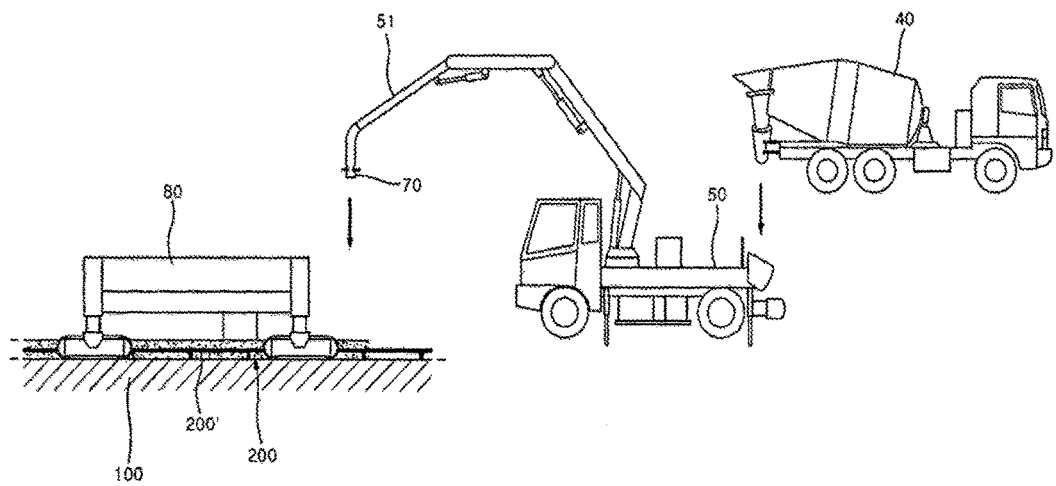
FIG. 8 is a diagram for illustrating a process of discharging a concrete according to the present disclosure.
Figure 9:
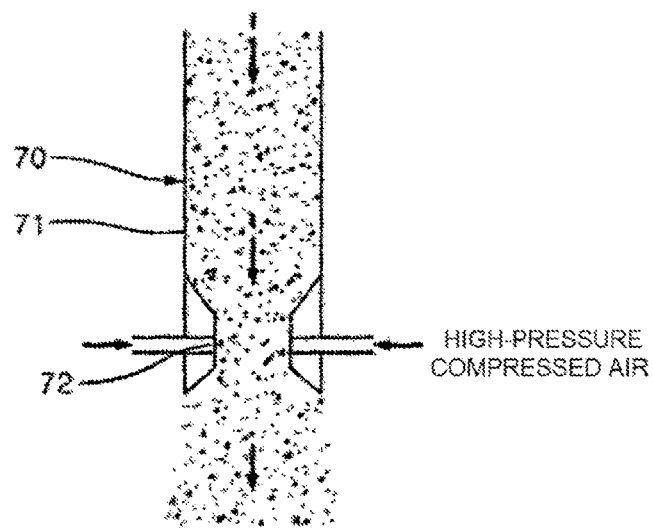
FIGS. 9 to 11 are diagrams for illustrating a process of shooting a concrete according to the present disclosure.
Figure 10:
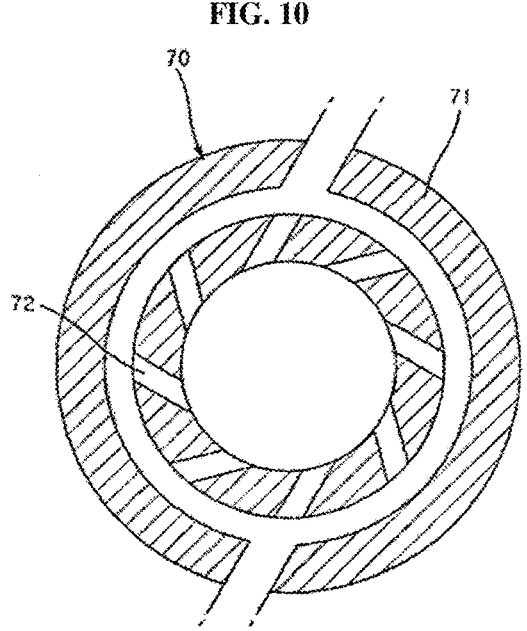

As shown in FIG. 8, the high-performance concrete formed as above is supplied to the pump car 50 and discharged to the base layer 100 through a shooting guide member 70 detachably mounted to a conveying pipe 51. As shown in FIGS. 8 to 10, if the high-performance concrete is supplied to the shooting guide member 70, the high-performance concrete is supplied to a shooting guide body 71 configured to have a hollow formed therethrough and have a central portion with a smaller diameter than an inlet and an outlet thereof, and simultaneously the high-performance concrete is compressed to generate a pressure.

Figure 11:
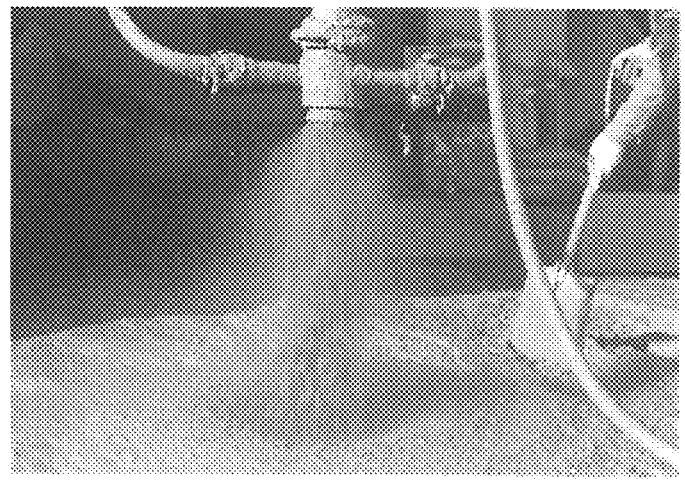

In addition, when the high-performance concrete is discharged via the center portion of the shooting guide body 71 to the outlet of the shooting guide body 71, which has a greater diameter than the center portion, a high-pressure air of 5 atmospheres or above is supplied to an air supply hole 72 formed with a slope in a radial direction at an outer circumference of the shooting guide body 71 and is swirled and shot to the outlet of the shooting guide body 71. At this time, as shown in FIG. 11, the compressed air and the high-performance concrete are spread in a spraying manner. When the compressed air and the high-performance concrete are spread in a spraying manner, the compressed air collides with the high-performance concrete to dissipate a large amount of air bubbles included in the high-performance concrete. Also, the dissipation of air bubbles decreases the slump, and thus the high-performance concrete is shot to the base layer 100 in a state of accommodating the steel bars 200', thereby constructing the continuously reinforced concrete pavement 200.

Here, if the continuously reinforced concrete pavement 200 is formed in a single layer, the pavement may be formed by shooting the high-performance concrete. However, if the continuously reinforced concrete pavement 200 is formed in two or more layers, a normal strength concrete prepared by mixing a low-grade mixed material with the normal concrete including air bubbles is shot to the base layer 100 by means of the shooting guide member 70 to accommodate steel bars 200' continuously positioned in longitudinal and transverse directions, thereby forming a lower layer 210 of the continuously reinforced concrete pavement 200, and then a high-performance concrete prepared by mixing a high-grade mixed material with the normal concrete including air bubbles is shot to the lower layer 210 by means of the shooting guide member 70 to have a smaller thickness than the lower layer 210, thereby forming an upper layer 220 of the continuously reinforced concrete pavement 200. In this way, it is possible to reduce construction costs and thus enhance economic feasibility in comparison to the case where the entire continuously reinforced concrete pavement 200 is formed using the high-performance concrete.

Figure 12:
FIGS. 12 to 14 are photographs showing slumps of a normal concrete, a normal strength concrete and a shotcrete according to the present disclosure.
Figure 13:
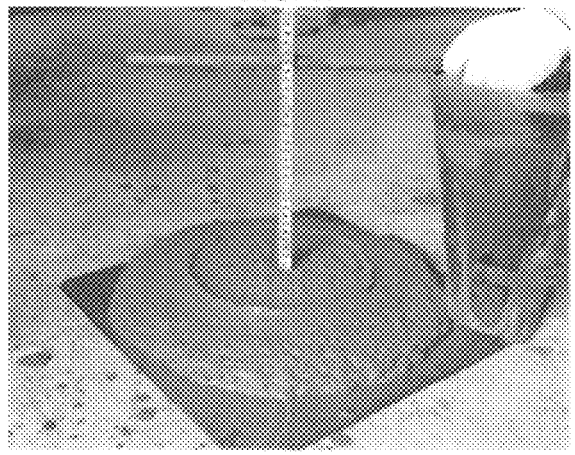
Figure 14:
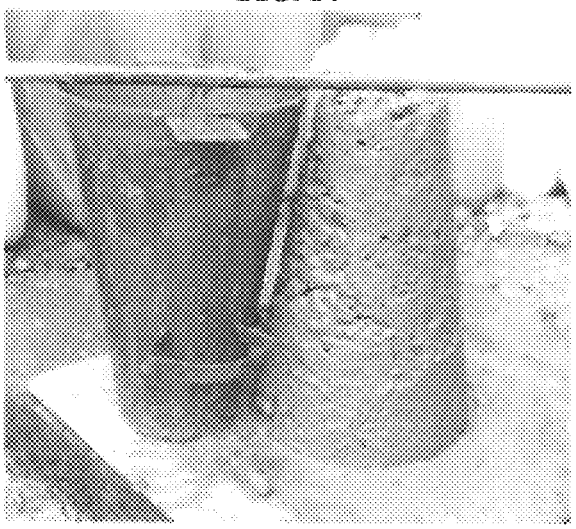

Table 1 shows experiment results in which air bubbles are put by an amount of 20%, 27% and 33% per unit volume into a normal concrete having a mixing strength of 27 MPa and a slump of 70 to 80 mm and then the normal concrete is shot at 9 atmospheres by using a compressor. As shown in FIGS. 12 to 14, if air bubbles are added by an amount of 20%, the slump which is 80 mm at the normal concrete is increased to 250 mm after the air bubbles are put, and is decreased to 90 mm after shooting. If air bubbles are added by an amount of 20%, 6.8 kg/m3 of water is added, but after final shooting, the slump is decreased since water molecules are partially dissipated into the air while the high-performance concrete is being shot. If air bubbles are put by an amount of 27% and 33%, since the unit amount added is great, after shooting, the final slump becomes greater than the slump of the normal concrete, but it may be found that the final air volume is consistent regardless of the air volume of the normal concrete or the air volume additionally put.

In addition, if the slump is increased by putting 20 to 33% of air bubbles in volume as described above, the normal concrete may be easily shot due to a good pumping property. Moreover, if only air bubbles are put and the normal concrete is shot, the final slump is 90 to 150 mm, which is too great, and thus when being shot to a slope target, the slip form paver is not useable since the concrete is too muddy. Therefore, a low-grade mixed material selected from fly ash, fine slag powder and a mixture thereof or a high-grade mixed material selected from silica fume, meta-kaolin, latex, polymer, coloring material and mixtures thereof, which is inexpensive and gives viscosity when being put into concrete, is additionally put into the normal concrete including air bubbles in a powder form so that the normal concrete may be shot with a lower water-binder ratio, and then the final slump is decreased to form a firm bottom, which makes it possible to use the slip form paver.

TABLE 1

Change of slump and air volume of normal concrete according to the amount of air bubbles put thereto

| Amount of put air bubbles | | Slump (mm) | | | Air volume (%) | | |
|---|---|---|---|---|---|---|---|
| amount of air bubbles | additional amount (kg/m³) | normal concrete | after putting air bubbles | after shooting | normal concrete | after putting air bubbles | after shooting |
| 20% | 6.8 | 80 | 250 | 90 | 7 | 20 | 6 |
| 27% | 9.1 | 70 | 260 | 100 | 5 | 27 | 7 |
| 33% | 18.1 | 70 | 275 | 150 | 5 | 33 | 7 |

In other words, the high-performance concrete prepared by putting a high-grade mixed material selected from silica fume, meta-kaolin, latex, polymer, coloring material and mixtures thereof into the normal concrete including air bubbles by the content of 2 to 20 parts by weight, based on 100 parts by weight of cement of the normal concrete, is shot to the base layer 100 while colliding with a high-pressure compressed air, and thus the air bubbles of the high-performance concrete are dissipated to ensure properties of the high-performance concrete.

In addition, if the continuously reinforced concrete pavement 200 has two layers, the normal strength concrete prepared by putting a low-grade mixed material selected from fly ash, fine slag powder and a mixture thereof into the normal concrete including air bubbles by the content of 3 to 30 parts by weight, based on 100 parts by weight of cement of the normal concrete, is shot to the base layer 100 while colliding with a high-pressure compressed air, thereby forming the lower layer 210 which may ensure properties of the normal strength concrete by dissipating the air bubbles of the normal strength concrete. Also, the high-performance concrete prepared by putting a high-grade mixed material selected from silica fume, meta-kaolin, latex, polymer, coloring material and mixtures thereof into the normal concrete including air bubbles by the content of 2 to 20 parts by weight, based on 100 parts by weight of cement of the normal concrete, is shot to the lower layer 210 while colliding with a high-pressure compressed air, and thus the air bubbles of the high-performance concrete are dissipated to ensure properties of the high-performance concrete.

Here, if the high-grade mixed material is mixed lower than the above range, high strength and high durability are deteriorated, and if the high-grade mixed material is mixed higher than the above range, construction costs increase without enhancing high strength and high durability further, and the slump decreases to result in increased adhesion.

If the upper layer 220 is formed to have a smaller thickness than the lower layer 210, high strength and high durability may be ensured identical to a structure made by placing a high-performance concrete. Thus, in comparison to a case where the entire continuously reinforced concrete pavement 200 is constructed using a high-performance concrete, construction costs may be reduced to ensure economic feasibility.

Table 2 shows experiment results in which air bubbles are put by the amount of 27% per unit volume into the normal concrete having a mixing strength of 27 MPa and a slump of 70 to 80 mm. The slump which is 70 mm at the normal concrete is increased to 260 mm after the air bubbles are put and decreased to 150 mm after silica fume powder is added by the content of 8%, based on cement. After shooting, the high-performance concrete has a zero slump. It may be found that the air volume which is 5% at the normal concrete is increased to 27% after the air bubbles are put, is decreased to 21% after the silica fume powder is added, and becomes 5% after shooting.

As described above, silica fume in a powder form is additionally added to the normal concrete having an increased slump by putting 27% of air bubbles in volume to form a high-performance concrete. By adding silica fume in a powder form, a water-binder ratio is decreased to form a high-performance concrete with good adhesion, and the high-performance concrete is shot to obtain the continuously reinforced concrete pavement 200 and the upper layer 220 of the continuously reinforced concrete pavement 200.

TABLE 2

Results of putting air bubbles and silica fume and shooting

| Item | normal concrete | after putting 27% of air bubbles | after putting silica fume | silica shooting |
|---|---|---|---|---|
| slump (mm) | 70 | 260 | 150 | 0 |
| air volume (%) | 5 | 27 | 21 | 5 |

Figure 15:
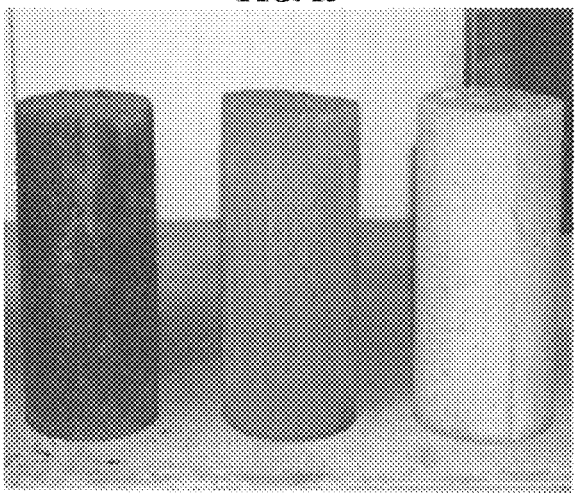
FIG. 15 is a diagram showing a coloring material mixed according to the present disclosure.

Here, as shown in FIG. 15, iron oxide and carbon black of the coloring material is mixed with the high-grade mixed material by the content of 1 to 8 parts by weight, based on 100 parts by weight of cement of the normal concrete, because the coloring reaches a saturation point in the range of 5 to 8% and a coloring concentration rapidly increases in the range of 1 to 3% depending on the kind of pigment. Since the pigment has a particle diameter smaller than cement, the amount of concrete increases by mixing the pigment, and as a result the water-cement ratio increases, which generally deteriorate strength. However, up to the range of 5 to 6% of cement, substantially no influence is given to properties before and after the concrete is hardened. Thus, considering that a saturation point of coloring is 5 to 8%, it is not desirable to add the pigment over 8% in aspect of economic feasibility.

The normal strength concrete and the high-performance concrete should be shot to the base layer 100 or the lower layer 210 while drawing a circle. In this case, the concrete fully fills up not only base layer 100 but also regions below the steel bars 200' positioned at regular intervals in longitudinal and transverse directions. Also, since the concrete is shot using a high-pressure compressed air, there is required no separate tamping. A slip form paver used as a general pavement device has tamping rods installed at intervals of 300 mm to perform vibration tamping with vibrations of 12,000 RPM, but this tamping function using vibrations in the concrete is a main factor of making the slip form paver heavy. Thus, since tamping is not required due to shorcreting, a pavement device such as the slip form paver may have a lightweight design.

Even though the concrete pavement is constructed by placing 100 m3 of concrete per unit time, a general shotcrete device may not be easily applied for constructing a concrete pavement due to insufficient concrete placing ability per unit time. However, if the concrete pump car is introduced so that a nozzle is attached to its end for shooting, sufficient placing ability for the concrete pavement is ensured, thereby improving construction ability.

Figure 16:
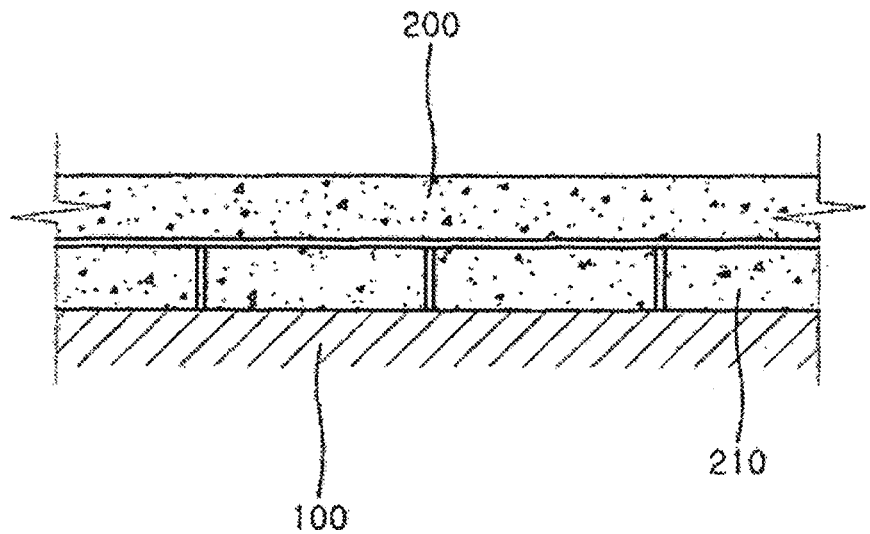
FIGS. 16 and 17 are diagrams showing a continuously reinforced concrete pavement constructed according to the present disclosure.
Figure 17:
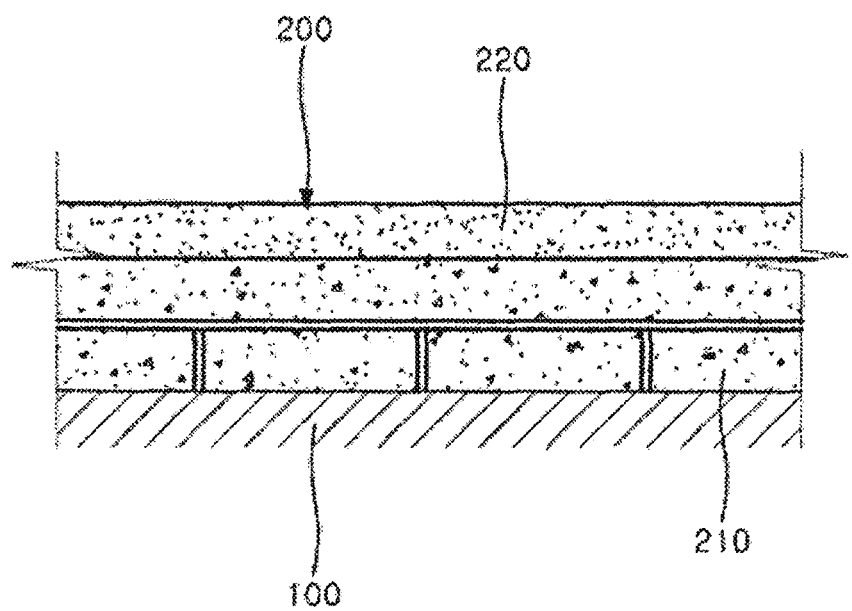

In addition, as shown in FIGS. 16 and 17, if the above process is performed to form the concrete pavement 200 or the lower layer 210 and the upper layer 220 of a two-layered concrete pavement 200, a slip form paver having a lightweight design, which does not demand vibrations in the concrete, is used for finishing the pavement to keep horizontality.

In the present disclosure, the embodiment is just an example, and the present disclosure is not limited thereto. Any feature whose construction and effect are identical to those defined in the claims of the present disclosure should be regarded as falling within the scope of the present disclosure.

The invention claimed is:
1. A method for constructing a continuously reinforced concrete pavement using foam shotcrete, the method comprising:
positioning steel bars at regular intervals in longitudinal and transverse directions on a base layer where a continuously reinforced concrete pavement is constructed, to be continuously connected for reinforcement, wherein the steel bars are positioned between a slip form paver and a pump car, with the pump car being located at a front side of the base layer and the slip form paver being located at a different side of the base layer;
producing a normal concrete having a compressive strength of 21 to 30 MPa by mixing water, cement and aggregate at a predetermined ratio and transporting the normal concrete to a construction site via a concrete mixer truck, the concrete mixer truck including a mixing part;
putting air bubbles by 20 to 33% volume amount of the normal concrete into the concrete mixer truck, and mixing the normal concrete with the air bubbles and a high-grade mixed material selected from the group consisting of silica fume, meta-kaolin, latex, polymer, coloring material, and mixtures thereof by using the mixing part to form a high-performance concrete; then supplying the high-performance concrete from the concrete mixer truck to the pump car; then shooting the high-performance concrete from the pump car to the base layer, wherein the high-performance concrete is discharged to the base layer through a shooting guide member of the pump car, with the pump car being located at the front side of the base layer and the slip form paver being located at the different side of the base layer, while dissipating the air bubbles included in the high-performance concrete to reduce a slump thereof by blowing a high-pressure compressed air of 5 atmospheres or above, thereby forming a continuously reinforced concrete pavement in which the steel bars are embedded; and finishing the continuously reinforced concrete pavement to have a horizontal top surface by the slip form paver located at the different side of the base layer without vibrating the continuously reinforced concrete pavement.

2. The method for constructing a continuously reinforced concrete pavement using foam shotcrete of claim 1, wherein the high-grade mixed material is mixed by the content of 2 to 20 parts by weight, based on 100 parts by weight of cement of the normal concrete.

3. The method for constructing a continuously reinforced concrete pavement using foam shotcrete of claim 1, wherein the coloring material is selected from the group consisting of iron oxide, carbon black, and mixtures thereof.

4. The method for constructing a continuously reinforced concrete pavement using foam shotcrete of claim 3, wherein the coloring material is mixed by the content of 1 to 8 parts by weight, based on 100 parts by weight of cement of the normal concrete.

5. The method for constructing a continuously reinforced concrete pavement using foam shotcrete of claim 1, wherein the mixing part comprises:
    a shaft configured to rotate by means of a power of a motor in a concrete mixer truck to which the normal concrete is put; and
    a mixing member formed at the shaft to have at least one stage in a radial direction to mix the normal concrete with the air bubbles and the high-grade mixed material while rotating in a rotation direction of the shaft.

6. The method for constructing a continuously reinforced concrete pavement using foam shotcrete of claim 1, wherein the slip form paver is configured not to include a vibrator for vibrating the continuously reinforced concrete pavement.

7. A method for constructing a continuously reinforced concrete pavement using foam shotcrete, the method comprising:
    positioning steel bars at regular intervals in continuously reinforced concrete pavement is constructed, to be continuously connected for reinforcement, wherein the steel bars are positioned between a slip form paver and a pump car, with the pump car being located at a front side of the base layer and the slip form paver being located at a different side of the base layer;
    producing a normal concrete having a compressive strength of 21 to 30 MPa by mixing water, cement and aggregate at a predetermined ratio and transporting the normal concrete to a construction site via a concrete mixer truck, the concrete mixer truck including a mixing part;
    putting air bubbles by 20% to 33% volume amount of the normal concrete into the concrete mixer truck, and mixing the normal concrete with the air bubbles and a low-grade mixed material selected from the group consisting of fly ash, fine slag powder, and mixtures thereof by using the mixing part to form a normal strength concrete, then supplying the normal strength concrete is supplied from the concrete mixer truck to the pump car, then discharging and shooting the normal strength concrete from the pump car to the base layer through a shooting guide member of the pump car, with the pump car being located at the front side of the base layer and the slip form paver being located at the different side of the base layer, while dissipating the air bubbles included in the normal strength concrete to reduce a slump thereof by blowing a high-pressure compressed air of 5 atmospheres or above, thereby forming a lower layer of a continuously reinforced concrete pavement in which the steel bars are embedded;

putting air bubbles by 20% to 33% volume amount of the normal concrete into the concrete mixer truck, and mixing the normal concrete with the air bubbles and a high-grade mixed material selected from the group consisting of silica fume, meta-kaolin, latex, polymer, coloring material, and mixtures thereof by using a mixing part to form a high-performance concrete, then supplying the high-performance concrete from the concrete mixer truck to the pump car, then discharging and shooting the high-performance concrete from the pump car to the base layer through the shooting guide member, with the pump car being located at the front side of the base layer and the slip form paver being located at the different side of the base layer, while dissipating the air bubbles included in the high-performance concrete to reduce a slump thereof by blowing a high-pressure compressed air of 5 atmospheres or above, thereby forming an upper layer of the continuously reinforced concrete pavement; and finishing the continuously reinforced concrete pavement to have a horizontal top surface by the slip form paver located at the different side of the base layer without vibrating the continuously reinforced concrete pavement.

8. The method for constructing a continuously reinforced concrete pavement using foam shotcrete of claim 7, wherein the low-grade mixed material is mixed by the content of 3 to 30 parts by weight, based on 100 parts by weight of cement of the normal concrete.

9. The method for constructing a continuously reinforced concrete pavement using foam shotcrete of claim 7, wherein the upper layer is formed to have a smaller thickness than the lower layer.

10. The method for constructing a continuously reinforced concrete pavement using foam shotcrete of claim 7, wherein the shooting guide member comprises:
    a shooting guide body having a hollow formed therethrough so that the normal strength concrete and the high-performance concrete are introduced therein, compressed and discharged, the shooting guide body being formed so that a central portion thereof has a smaller diameter than an inlet and an outlet thereof at which each concrete is introduced and discharged; and
    an air supply hole formed through the shooting guide member to supply a high-pressure air of 5 atmospheres or above so as to reduce an air volume while dissipating air bubbles included in each concrete introduced into the shooting guide body.

11. The method for constructing a continuously reinforced concrete pavement using foam shotcrete of claim 10, wherein the air supply hole is formed with a slope in a radial direction at an outer circumference of the shooting guide body.

12. The method for constructing a continuously reinforced concrete pavement using foam shotcrete of claim 7, wherein when positioning steel bars to be continuously connected for reinforcement, the steel bars are assembled by means of field assembly in a space between the slip form paver and the pump car or are manufactured at a factory, transported to a construction site and then connected at the construction site.

13. The method for constructing a continuously reinforced concrete pavement using foam shotcrete of claim 7, wherein the high-grade mixed material is mixed by the content of 2 to 20 parts by weight, based on 100 parts by weight of cement of the normal concrete.

14. The method for constructing a continuously reinforced concrete pavement using foam shotcrete of claim 7, wherein the coloring material is selected from the group consisting of iron oxide, carbon black, and mixtures thereof.

15. The method for constructing a continuously reinforced concrete pavement using foam shotcrete of claim 14, wherein the coloring material is mixed by the content of 1 to 8 parts by weight, based on 100 parts by weight of cement of the normal concrete.

16. The method for constructing a continuously reinforced concrete pavement using foam shotcrete of claim 7, wherein the mixing part comprises:
   a shaft configured to rotate by means of a power of a motor in a concrete mixer truck to which the normal concrete is put; and
   a mixing member formed at the shaft to have at least one stage in a radial direction to mix the normal concrete with the air bubbles and the low-grade or high grade mixed material while rotating in a rotation direction of the shaft.

17. The method for constructing a continuously reinforced concrete pavement using foam shotcrete of claim 7, wherein the slip form paver is configured not to include a vibrator for vibrating the continuously reinforced concrete pavement.

* * * * *